US011632162B1

(12) United States Patent
Metwaly Saad et al.

(10) Patent No.: US 11,632,162 B1
(45) Date of Patent: Apr. 18, 2023

(54) EXPLOITING EXTENDED REALITY PERCEPTION DATA FOR BEAM MANAGEMENT

(71) Applicant: QUALCOMM Incorporated, San Diego, CA (US)

(72) Inventors: Hussein Metwaly Saad, San Diego, CA (US); Peerapol Tinnakornsrisuphap, San Diego, CA (US); Prashanth Haridas Hande, San Diego, CA (US); Gerhard Reitmayr, Del Mar, CA (US); Abhijeet Bisain, San Diego, CA (US); Chih-Ping Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/449,621

(22) Filed: Sep. 30, 2021

(51) Int. Cl.
*H04L 23/02* (2006.01)
*H04B 7/06* (2006.01)
*H04B 7/0456* (2017.01)
*H04W 36/06* (2009.01)
*G01S 13/89* (2006.01)

(52) U.S. Cl.
CPC ............ *H04B 7/0695* (2013.01); *G01S 13/89* (2013.01); *H04B 7/0473* (2013.01); *H04B 7/0632* (2013.01); *H04W 36/06* (2013.01)

(58) Field of Classification Search
CPC ... H04L 1/0054; H04L 1/005; H04L 27/2647; H04L 5/0007; H04B 7/0417; H04B 7/1555; H04B 7/0802

USPC .......................................... 375/262, 260, 267
See application file for complete search history.

(56) References Cited

U.S. PATENT DOCUMENTS

| 2017/0207845 | A1* | 7/2017 | Moon ................... H04B 7/088 |
| 2019/0150003 | A1* | 5/2019 | He ....................... H04B 7/0617 |
| | | | 342/368 |
| 2019/0182852 | A1* | 6/2019 | Zhu ................... H04W 72/1231 |
| 2019/0378476 | A1* | 12/2019 | Jeon ........................ G06N 20/00 |
| 2021/0136614 | A1* | 5/2021 | Murray ................. H04L 5/0048 |
| 2021/0360330 | A1* | 11/2021 | Stockhammer ...... H04N 21/816 |
| 2021/0373118 | A1* | 12/2021 | Bao ....................... H04L 5/0058 |

* cited by examiner

*Primary Examiner* — Khai Tran
(74) *Attorney, Agent, or Firm* — Norton Rose Fulbright US LLP

(57) ABSTRACT

This disclosure provides systems, methods, and devices for wireless communication that support enhanced beam management using extended reality (XR) perception data. In a first aspect, a method of wireless communication includes establishing a communication connection between a user equipment (UE) and a serving base station using a current serving beam selected by the UE from a plurality of available beams paired with a serving base station beam. The method further includes obtaining, perception information from one or more extended reality sensors associated with the UE and determining, in response to detection of UE movement, a transpositional representation of the movement using the perception information. The UE may then select a new serving beam in accordance with the transpositional representation. Other aspects and features are also claimed and described.

30 Claims, 7 Drawing Sheets

EXPLOITING EXTENDED REALITY PERCEPTION DATA FOR BEAM MANAGEMENT

TECHNICAL FIELD

Aspects of the present disclosure relate generally to wireless communication systems, and more particularly, to wireless-enabled extended reality (XR) operations in millimeter wave (mmW) environments. Some features may enable and provide improved communications, including exploitation of XR perception data for beam management in XR operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a UE includes establishing a communication connection between the UE and a serving base station using a current serving beam selected by the UE from a plurality of available beams paired with a serving base station beam, obtaining, by the UE, perception information from one or more extended reality sensors associated with the UE, determining, by the UE, in response to detection of a movement of the UE, a transpositional representation of the movement using the perception information, and selecting, by the UE, a new serving beam from the plurality of available beams, wherein the selecting is in accordance with the transpositional representation.

In an additional aspect of the disclosure, an apparatus configured for wireless communication is disclosed. The apparatus includes at least one processor, and a memory coupled to the at least one processor. The at least one processor is configured to establish a communication connection between the UE and a serving base station using a current serving beam selected by the UE from a plurality of available beams paired with a serving base station beam, to obtain, by the UE, perception information from one or more extended reality sensors associated with the UE, to determine, by the UE, in response to detection of a movement of the UE, a transpositional representation of the movement using the perception information, and to select, by the UE, a new serving beam from the plurality of available beams, wherein the selection is in accordance with the transpositional representation In an additional aspect of the disclosure, an apparatus configured for wireless communication is disclosed. The apparatus includes means for establishing a communication connection between the UE and a serving base station using a current serving beam selected by the UE from a plurality of available beams paired with a serving base station beam, means for obtaining, by the UE, perception information from one or more extended reality sensors associated with the UE, means for determining, by the UE, in response to detection of a movement of the UE, a transpositional representation of the movement using the perception information, and means for selecting, by the UE, a new serving beam from the plurality of available beams, wherein the selection is in accordance with the transpositional representation.

In an additional aspect of the disclosure, a non-transitory computer-readable medium stores instructions that, when executed by a processor, cause the processor to perform operations including establishing a communication connection between the UE and a serving base station using a current serving beam selected by the UE from a plurality of available beams paired with a serving base station beam, obtaining, by the UE, perception information from one or more extended reality sensors associated with the UE, determining, by the UE, in response to detection of a movement of the UE, a transpositional representation of the movement using the perception information, and selecting, by the UE, a new serving beam from the plurality of available beams, wherein the selecting is in accordance with the transpositional representation.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
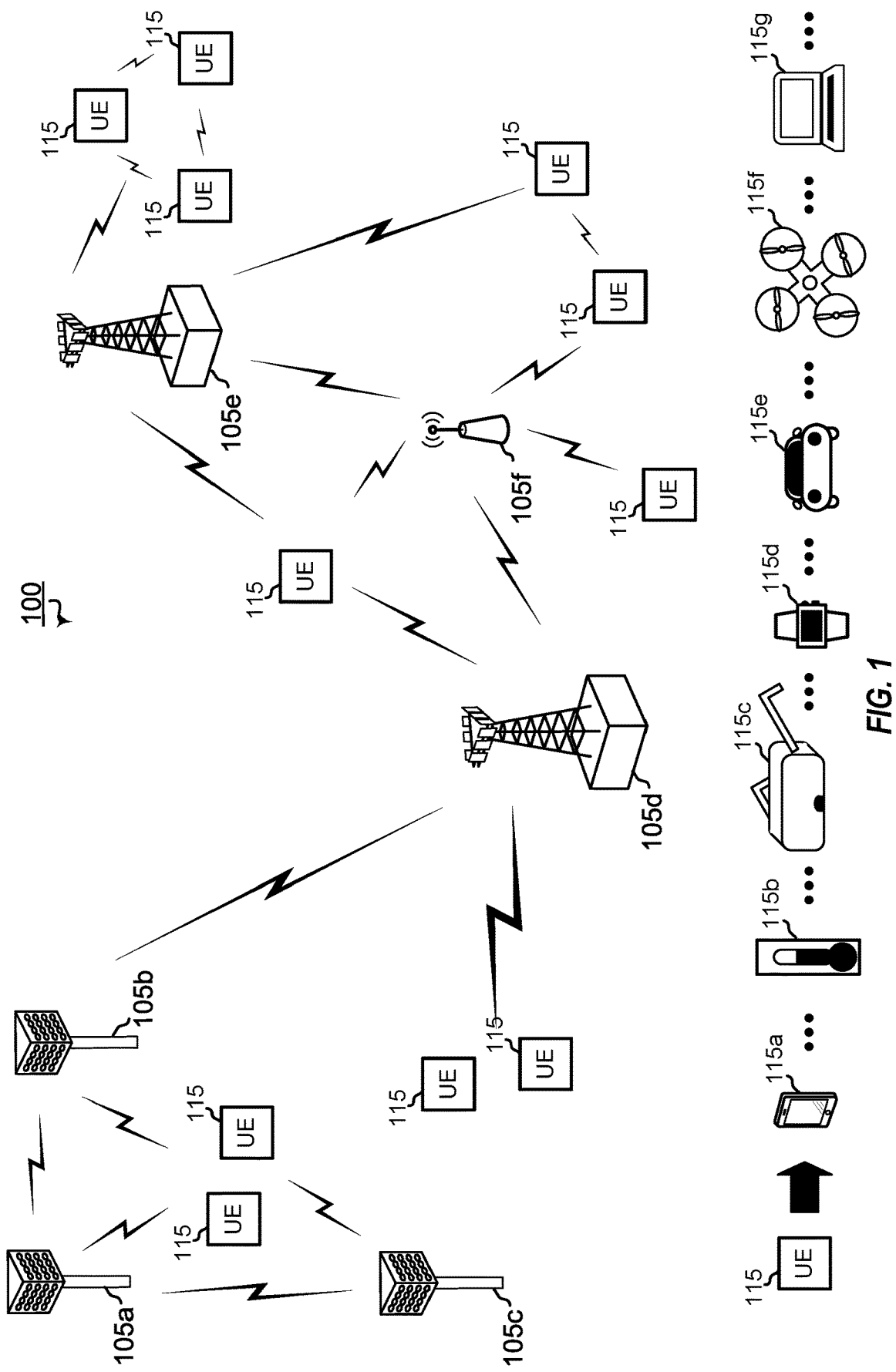
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support enhanced beam management using XR perception data according to aspects of the present disclosure. Particular implementations of the subject matter described in this disclosure may be implemented to realize one or more of the following potential advantages or benefits. In some aspects, perception information may be used in beam management operations. The perception information allows for more a more intelligent beam selection mechanism that is in accordance with the actual environment within which the UE is located instead of according to predetermined operations, such as the round robin sequence, which functions without regard to environmental influences. The intelligent beam selection with the perception information can reduce latency by reducing the time to measure and select the optimum beam. The reduced measurement and selection time further results in power savings at the UE.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.99999% reliability), ultra-low latency (e.g., ~1 millisecond (ms)), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include smart phone 115a (e.g., a mobile phone or a cellular (cell) phone, a session initiation protocol (SIP) phone, a wireless local loop (WLL) station), a wireless sensor device 115b, a head-mounted display (HMD) 115c, a wearable device 115d, a connected automobile 115e, a drone 115f, or a personal computer 115g (e.g., a laptop, a personal computer (PC), a notebook, a netbook, a smart book, a tablet, and a personal digital assistant (PDA)). UE 115 as a mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, an HMD, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115 of the implementation illustrated in FIG. 1 may also be examples of mobile smart phone-type devices (e.g., smart phone 115a) accessing wireless network 100. UE 115 may also be a machine specifically configured for connected communication, including machine type communication (MTC), enhanced MTC (eMTC), narrowband IoT (NB-IoT) and the like. Smart phone 115a, wireless sensor device 115b, HMD 115c, wearable device 115d, connected automobile 115e, drone 115f, and personal computer 115g illustrated in FIG. 1 are examples of various UEs 115 configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115 using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115, configured as drone 115f. Redundant communication links with UE 115e include from macro base stations 105d and 105e, as well as small cell base station 105f. Other machine type devices, such as wireless sensor device 115b, HMD 115c, and wearable device 115d may communicate through wireless network 100 either directly with base stations, such as small cell base station 105f, and macro base station 105e, or in multi-hop configurations by communicating with another user device which relays its information to the network, such as wireless sensor device 115 communicating temperature measurement information smart phone 115a, which is then reported to the network through small cell base station 105f. Wireless network 100 may also provide additional network efficiency through dynamic, low-latency TDD communications or low-latency FDD communications, such as in a vehicle-to-vehicle (V2V) mesh network between multiple instances of connected automobile 115e communicating with macro base station 105e.

Figure 2:
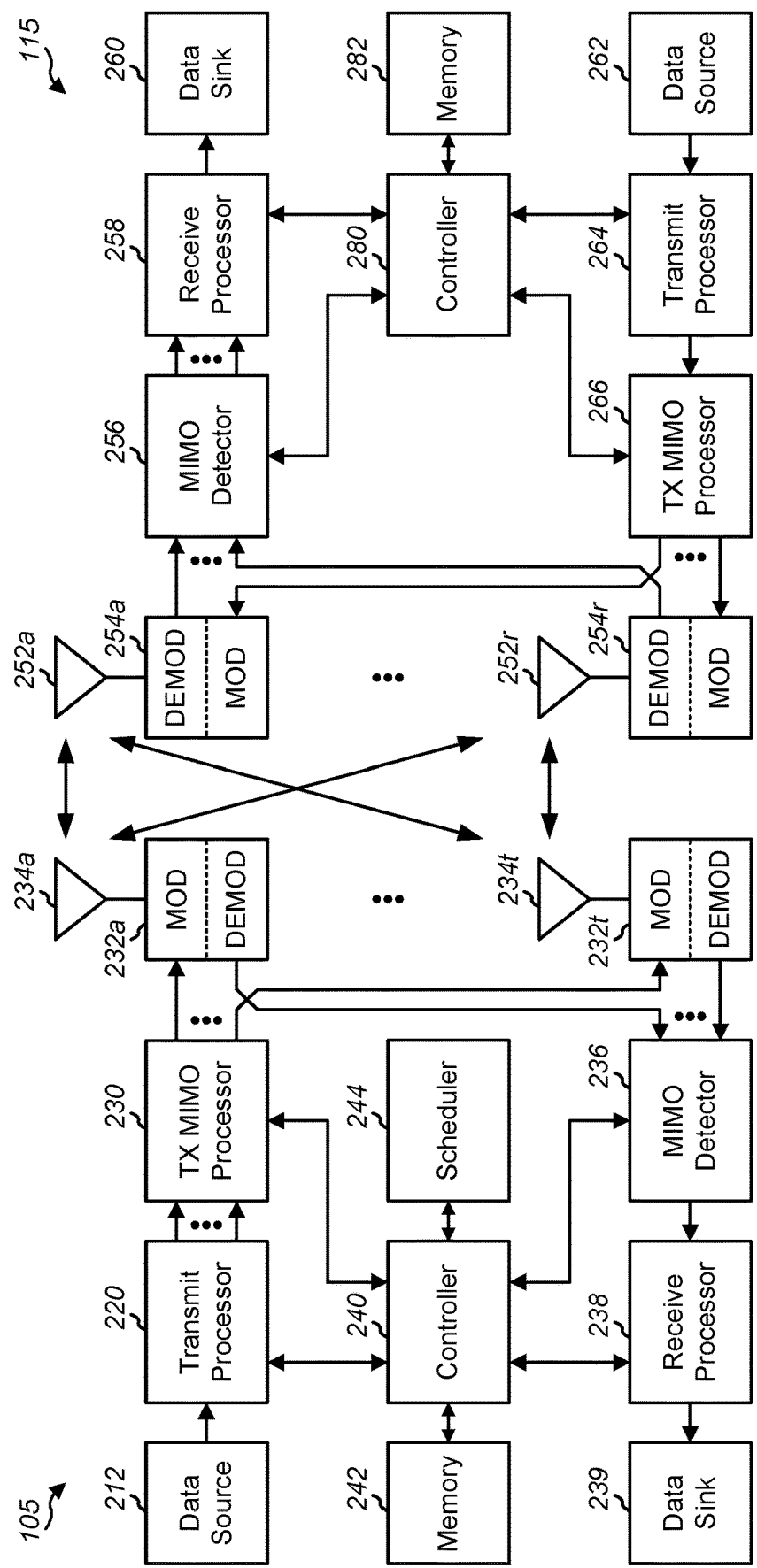
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 3, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-βs, or a 25-βs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-µs slots, may also be referred to as a "Type 1 LBT." An abbreviated LBT procedure, such as a CAT 2 LBT procedure, which may include a one-shot CCA for 16-µs or 25-µs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

As noted above, millimeter-wave (mmW) spectrum has been proposed for the fifth generation (5G) communication networks. mmW operations may result for a higher throughput, due to a larger bandwidth, but, the higher frequencies of mmW communications may also suffer from a higher path loss. The smaller wavelengths associated with mmW may allow for more antennas at UEs and base-stations. The higher number of antennas may further allow for directional analog beams transmitted at higher powers that can overcome link sensitivities. However, directional beams may use more beams for similar coverage, which may lead to more sensitivity to UE rotation and motion and, thus, more sensitivity to beam blockage.

Operations at mmW frequencies involves beam management procedures, which select or track the beam pair supporting communications between the UE and the base station at any given time. With too many available beams, the UE and base station would perform significant search operations to find and select the optimal beam pair (e.g., the UE selects the UE serving beam and the base station selects the base station serving beam making up the active beam pair). Exhaustively searching each candidate beam may involve many beam measurements by UEs and base station, which costs a high power consumption. While the base station does not typically have power limits, UEs general do and performing complex beam management calculations may represent a significant impact on battery life at the UE. Moreover, the calculations are computationally complex, therefore, the high power consumption is, in part, due to the delays that occur in completing the complex calculations, and, such delays may further impact the timing of the communication, which may become unacceptable at a certain length.

Currently, a hierarchical beam codebook may be used in which both narrow and wide beams may be used at the base station and at the UE. With good link conditions, the narrow beams may be used, while in worse conditions, the wider beams may be used. Each such beam may have a parent beam, that is getting wider, children beams, which are getting narrower, and neighbor beams, which are rotating and moving. A beam measurement scheduler within the base station and UE makes use of hierarchical codebooks and past measurements to determine a list of beams to be measured, e.g., neighbors and parents of the current serving beam. The base station and UEs perform measurements of the beams in this list of available beams in a predetermined round robin sequence. Beam selector functionality within the base station and UE may then select the base station serving beam and UE serving beam, respectively, for the serving beam pair. This selection may be made to maximize one or more wireless channel statistics or link condition parameters, such as reference signal received power (RSRP), signal-to-noise ratio (SNR), or the like.

The current procedure enabled by the beam measurement scheduler systematically determines the list of candidate beams without information about the positioning of the UE or the environmental behavior in which the UE is located, and, thus, may have limitations in selecting the appropriate candidate beams, such as when the UE has moved or rotated, whether an object has blocked a particular signal path, or the like. Additionally, the predetermined round robin sequence for measurement may cause a delay in selecting the optimal beam when some condition or movement at the UE has occurred favoring a beam in the opposite direction of the round robin sequence. This delay in finding the optimal beam results in power wasted in unnecessarily measuring more beams to find the optimal beam. It may be beneficial to have more information about the UE and/or the environmental behavior and use this information to help with the beam list selection. This intelligent beam measurement scheduling may result in lower latency and power gains.

In 5G NR operations at mmW frequencies, the beams are formed at the UE and the base station using analog beamforming techniques, such that each beam is pointing in a given direction. Thus, beamforming can be viewed as dividing the spatial environment into multiple grids, where each beam covers a particular grid. 5G-compatible devices, such as mobile phones, self-driving vehicles, virtual/augmented reality headsets, and the like, may be equipped with one or more inertial measurement unit (IMU) sensors and one or more cameras. These sensors and cameras, which are referred to herein as extended reality (XR) sensors, can capture or estimate positional and environmental features that can also be of grid-nature. According to the various aspects of the present disclosure, a UE may use this type of information, referred to herein as perception information, to intelligently assist with beam management.

XR is a term referring to real-and-virtual combined environments and human-machine interactions generated by computer technology and wearable devices. XR is an umbrella term encapsulating augmented reality (AR), virtual reality (VR), mixed reality (MR), and the like. In the XR use case, several types of perception information (e.g., positional and environmental information) is available at a given time instance. One such type of perception information is known or referred to as six degrees of freedom (6 DoF). There are six total degrees of freedom relative to a rigid object's motion through space. Three degrees correspond to rotational movement around the x, y, and z axes, commonly termed pitch, yaw, and roll. The other three degrees correspond to translational movement along those axes, which can be thought of as moving forward or backward, moving left or right, and moving up or down. 6 DoF information may be tracked and monitored via XR sensors and the logic that processes this sensor data into 6 DoF information. In one example implementation of 6 DoF representation, the location and orientation of the user/user device in the three-dimensional (3D) space may be formatted using a translation vector $[\delta_x, \delta_y, \delta_z]$ that describes the translation motion from time t to t+1, and a rotation 3×3 matrix [r11, r12, r13; r21,r22,r23; r31,r32,r33] that describes a relative rotational position or motion over the time window.

Another type of perception information available from XR sensors includes camera based information. A device camera may capture a snapshot image of the surrounding environment at a time, t. This snapshot image may be black-and-white format or color format. The snapshot image may then be analyzed using object recognition techniques to identify the objects and spaces within the snapshotted environment. A further type of perception information available from XR sensors is known or referred to as simultaneous localization and mapping (SLAM) data. SLAM data includes a list of points captured by the XR sensors that provide a small-scale map of the visual environment, including detection of small-scale objects, the shape of a room, and the like.

Figure 3:
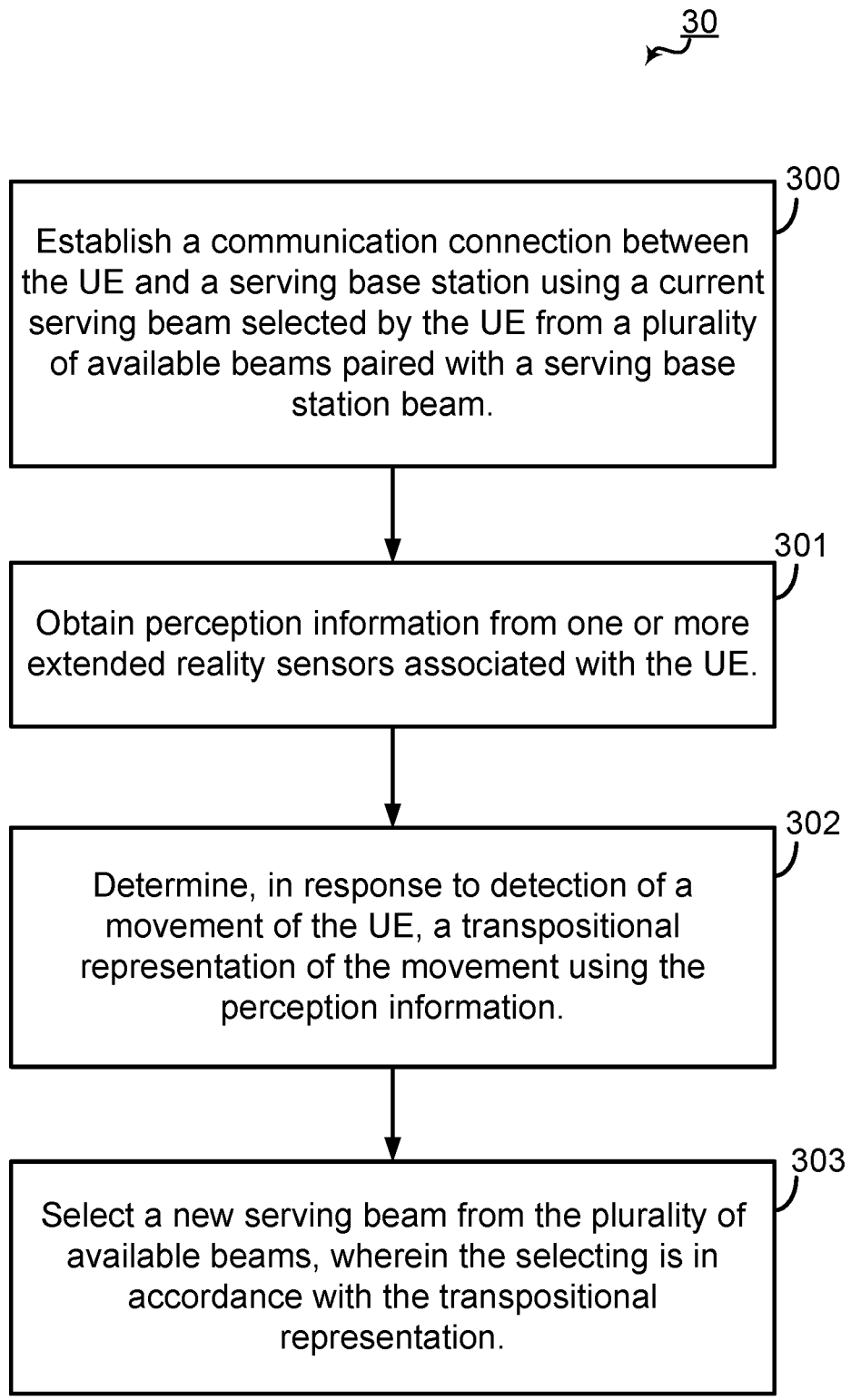
FIG. 3 is a block diagram illustrating example block executed by a UE to provide enhanced beam management using extended reality (XR) perception data according to aspects of the present disclosure.

FIG. 3 is a block diagram illustrating example blocks of a process 30 that supports enhanced beam management using XR perception data according to one or more aspects. Operations of process 30 may be performed by a UE, such as UE 115 described above with reference to FIG. 1, 2, or 6. For example, example operations (also referred to as "blocks") of process 30 may enable UE 115 to support enhanced beam management using XR perception data. The blocks of process 30 will also be described with respect to operations and functionality of UE 115, as described in FIG. 6.

Figure 6:
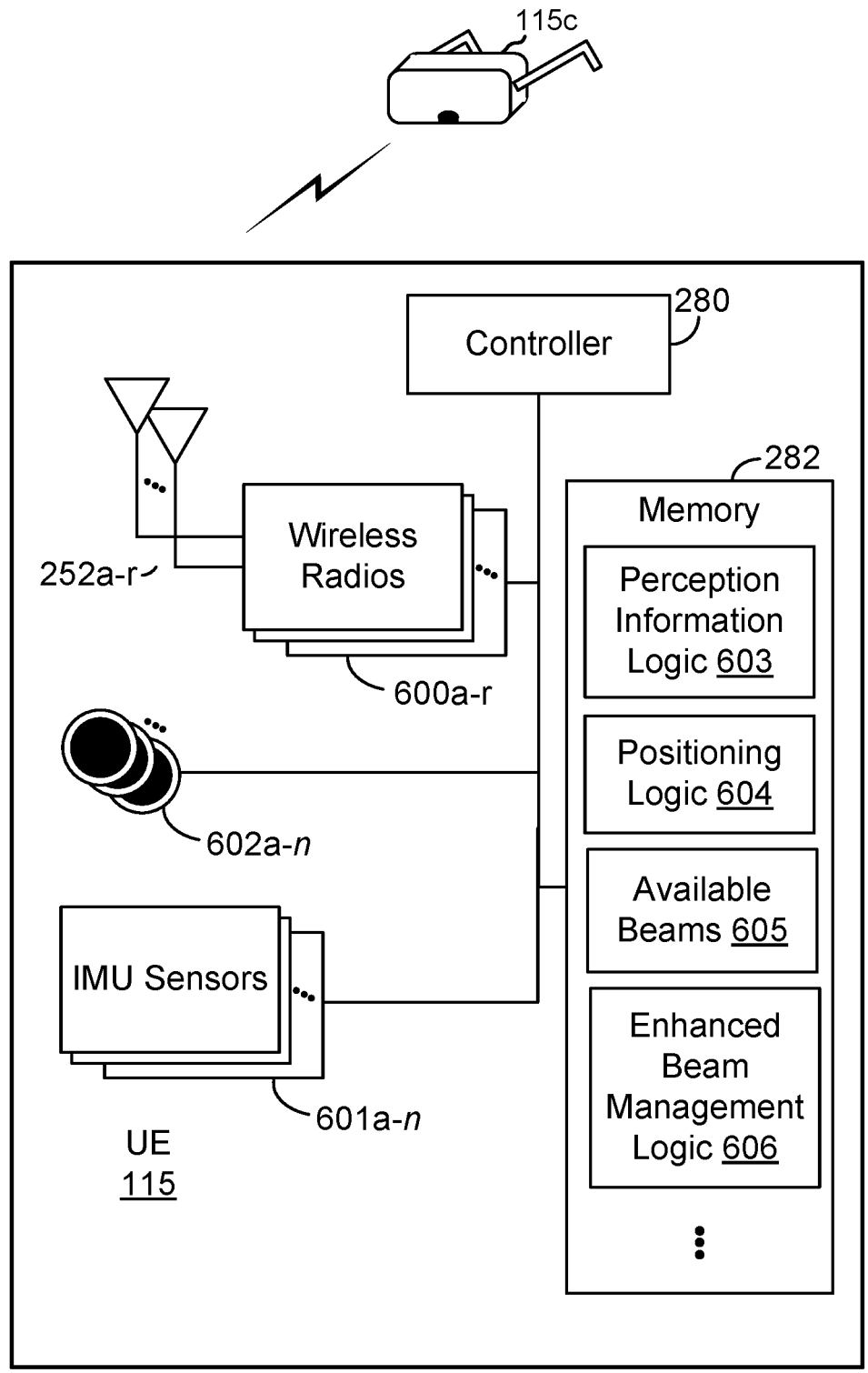
FIG. 6 is a block diagram of an example UE that supports enhanced beam management using XR perception data according to one or more aspects.

FIG. 6 is a block diagram of an example UE 115 that supports enhanced beam management using XR perception data according to one or more aspects. In some implementations, UE 115 includes the structure, hardware, and components shown and described with reference to UE 115 of FIGS. 1-2. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 600a-r and antennas 252a-r. Wireless radios 600a-r include various components and hardware, as illustrated in FIG. 2 for UE 115, including modulator and demodulators 254a-r, MIMO detector 256, receive processor 258, transmit processor 264, and TX MIMO processor 266. UE 115 may also include XR sensors, such as IMU sensors 601a-n and cameras 602a-n. IMU sensors 601a-n and cameras 602a-n may capture various environmental information that can provide perception information to UE 115 with regard to its surround environment. UE 115 may further obtain perception information from XR sensors residing in separate devices that may be in communication with UE 115. For example, UE 115 may further obtain perception information from XR sensors within HMD 115c.

As shown, memory 282 may include perception information logic 603, positioning logic 604, and available beams 605. Perception information logic 603 may be configured to receive sensor data from IMU sensors 601a-n, cameras 602a-n, and/or HMD 115c and generate perception information regarding the position or orientation of UE 115 within its environment as determined from the received sensor data. Positioning logic 604 may be configured to determine a transpositional representation of the movement of UE 115 using the perception information. Available beams 605 operates as the buffer that holds the number of candidate beams that the UE may measure for beam management in its communication with a serving base station. UE 115 may receive signals from or transmit signals to one or more network entities, such as base station 105 of FIGS. 1 and 2.

At block 300, communications is established between the UE and a serving base station using a current serving beam selected by the UE from a plurality of available beams paired with a serving base station beam. Communications may be established between a UE, such as UE 115, and a serving base station, whether initiated by UE 115 or the serving base station, using mmW frequencies. Within the mmW spectrum, UE 115 and the serving base station communicate via paired beams, including a UE serving beam and a base station serving beam. UE 115 may maintain a list of candidate available beams for communications in the direction of the serving base station and store such candidate beams in memory 282 at available beams 605.

At block 301, the UE obtains perception information from one or more XR sensors associated with the UE. UE 115 may include multiple XR sensors, such as IMU sensors 601a-n and cameras 602a-n. and is in communication with external sensors, such as HMD 115c. When using XR-type functionalities, UE 115, under control of controller 280, may execute perception information logic 603. Execution of the instructions and code of perception information logic 603 enables the functionality of UE 115 to obtain perception information. The execution of the instructions and code to implement the functionality is referred to herein as the "execution environment" of perception information logic 603. Within the execution environment of perception information logic 603, UE 115 controls or communicates with XR sensors, such as IMU sensors 601a-n and/or cameras 602a-n and/or HMD 115c to gather sensor data and then uses the sensor data to determine the perception information regarding the position or orientation of UE 115 within its environment.

At block 302, the UE determines, in response to detection of a movement of the UE, a transpositional representation of the movement using the perception information. With further use of XR-type functionalities, UE 115, under control of controller 280, may execute positioning logic 604, stored in memory 282. The execution environment of positioning logic 604 provides UE 115 with the functionality to use the perception information to determine or calculate a transpositional representation of its movement. Such determination of the transpositional representation may use the prior position of UE 115 in addition to the position of the serving base station, whether provided by the base station or determined by UE 115 using other means.

At block 303, the UE selects a new serving beam from the plurality of available beams, wherein the selecting is in accordance with the transpositional representation. In operation of the features and functionalities of the various aspects of the present disclosure, UE 115, under control of controller 280, may execute enhanced beam management logic 606, stored in memory 282. Within the execution environment of enhanced beam management logic 606 enables UE 115 to use the transpositional representation to intelligently identify the beams to measure within available beams 605 after which UE 115 would select the optimal beam for continued communications with the serving base station.

According to the various aspects of the present disclosure, perception information may be used in beam management operations. The perception information allows for more a more intelligent beam selection mechanism that is in accordance with the actual environment within which the UE is located instead of according to predetermined operations, such as the round robin sequence, which functions without regard to environmental influences. The intelligent beam selection with the perception information can reduce latency by reducing the time to measure and select the optimum beam. The reduced measurement and selection time further results in power savings at the UE.

Figure 4A:
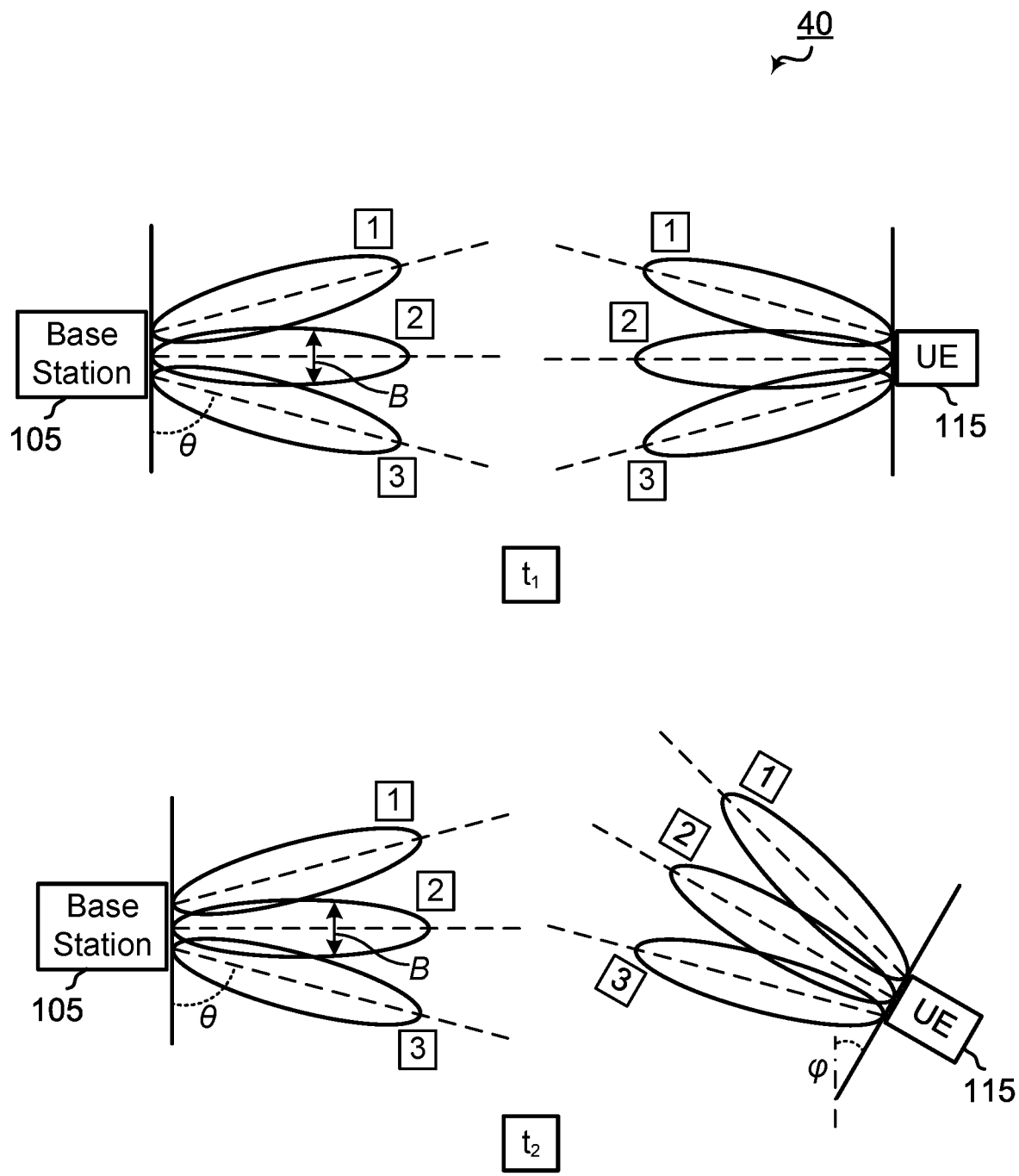
FIGS. 4A and 4B are block diagrams illustrating two time instances, $t_1$ and $t_2$, of a wireless communication network operating within mmW frequencies including a base station and UE in communication, in which the UE is configured to provide enhanced beam management using XR perception data according to one or more aspects.

FIG. 4A is a block diagram illustrating two time instances, $t_1$ and $t_2$, of a wireless communication network 40 operating within mmW frequencies including a base station 105 and UE 115 in communication, in which UE 115 is configured to provide enhanced beam management using XR perception data according to one or more aspects. As illustrated, base station 105 and UE 115 use beam codebooks including a number of candidate beams (beams 1-3 for each of base station 105 and UE 115, respectively). Each of beams 1-3 include corresponding azimuth angles, θ, identifying the beam's directional orientation and beam width B. As illustrated in time instance, $t_1$, base station 105 has selected base station beam 2, and UE 115 has selected UE beam 2 as the serving beam pairs (2,2) for communication.

It should be noted that, while illustrated in a 2-dimensional (2D) beam management scenario, the aspects of the present disclosure are equally applicable to 3D beam management scenarios. A beam in 2D can be represented by an azimuth angle (θ) and a one-dimensional beam width B. In 3D scenarios, each beam can be represented by azimuth angle (θ) and elevation angles (not shown) and a 2D beam width, such that each beam can be approximated by a point in 3D space using the azimuth and elevation angles and 2D beam width.

The aspects of the present disclosure assume that the UE beam codebook details are known to UE 115 (e.g., # beams with the corresponding angles and beam widths). UE 115 may be calibrated to identify the UE beam directions in the same coordinate system as used by its XR operations, from which it obtains the perception information. At time $t_2$, UE 115 has rotated clockwise. The angle of rotation, φ, has resulted in UE beam 2 no longer being the optimum beam for communication.

If UE 115 does not know that it has rotated, according to the existing beam management technology, it would use a round-robin sequence to measure the candidate beams (beams 1-3). As illustrated, it appears that UE beam 3 is now the optimal beam. A round-robin sequence may result in UE beam 3 being measured last depending on the sequence established, which may lead to performance degradation until UE beam 3 is measured.

As illustrated, UE 115 obtains perception information from XR sensors and knows that it has rotated by an angle, φ. UE 115 may then create a transpositional representation of the φ rotation in order to prioritize measurement of UE beam 3 first. This intelligent use of perception information, thus, leads to better performance. With the rotation matrix available from the perception information, once UE 115 rotates, UE 115 may create the transpositional representation from this matrix and multiply the beam point with the transpositional representation to get the new direction in which UE 115 should begin measuring the candidate beams (beams 1-3).

Figure 4B:
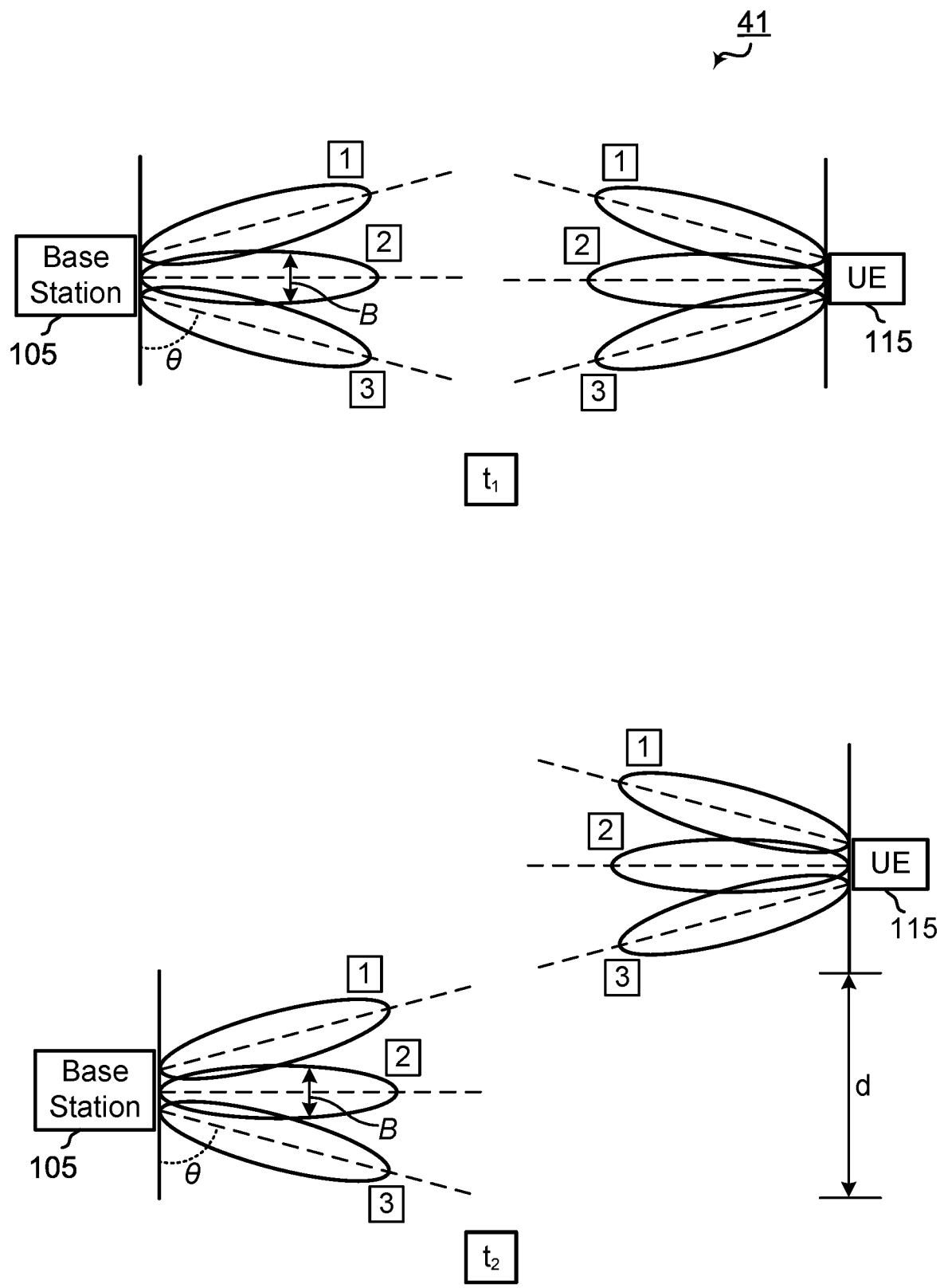

FIG. 4B is a block diagram illustrating two time instances, $t_1$ and $t_2$, of a wireless communication network 41 operating within mmW frequencies including a base station 105 and UE 115 in communication, in which UE 115 is configured to provide enhanced beam management using XR perception data according to one or more aspects. As illustrated, base station 105 and UE 115 use beam codebooks including a number of candidate beams (beams 1-3 for each of base station 105 and UE 115, respectively). As noted with respect to FIG. 4A, each of beams 1-3 include corresponding azimuth angles, θ, identifying the beam's directional orientation and beam width B. As illustrated in time instance, $t_1$, base station 105 has selected base station beam 2, and UE 115 has selected UE beam 2 as the serving beam pairs (2,2) for communication.

At time, $t_1$, the serving beam pair of base station 105 and UE 115 are (2,2). At time, $t_2$, UE 115 moves a linear distance, d, from its previous position at time, $t_1$, and, hence, as illustrated, the UE serving beam should change from UE beam 2 to UE beam 3. Similarly, base station 105 should also change the base station serving beam from base station beam 2 to base station beam 1. Because base station 105 does not know that UE 115 has moved, it will wait for UE 115 to report the best beam that it should use. Thus, in the meantime, base station 105 continues to use base station beam 2. If UE 115 does not know that it has moved, under the existing beam management procedure, it may use a predetermined round-robin sequence to measure its available UE beams 1-3. Thus, UE beam 3 may be measured last in such a sequence, again, leading to performance degradation until UE beam 3 is measured.

As illustrated in FIG. 4B, UE 115 obtains perception information from XR sensors that identifies its new location. UE 115 may use the perception information to determine a transpositional representation that may then be used to prioritize measurement of UE beam 3 leading to better performance, even though base station 105 still uses base station beam 2.

As noted above, the same aspects can be applied to 3D beam management scenarios where each beam is described by azimuth and elevation angles and a two-dimensional beam width.

Figure 5:
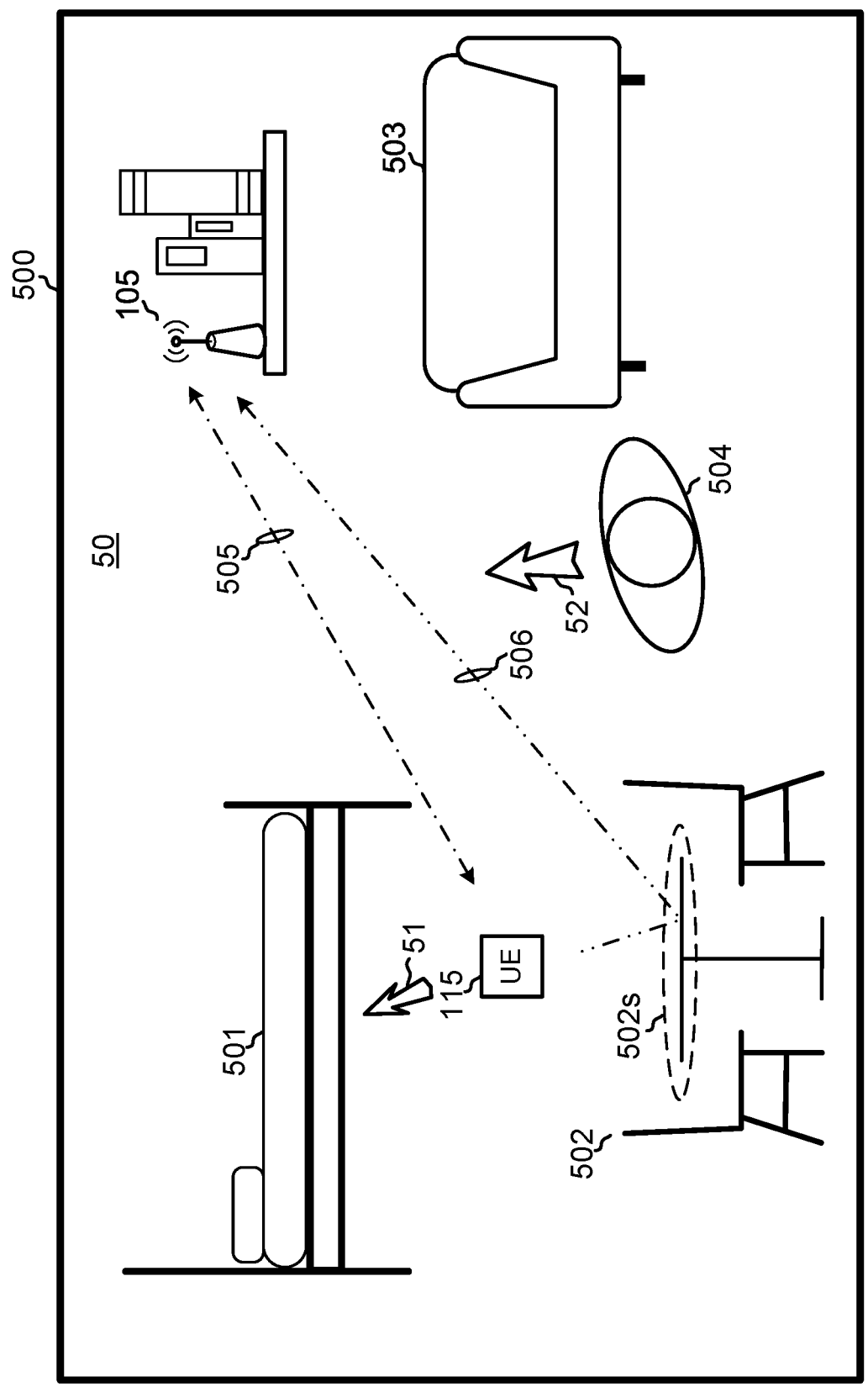
FIG. 5 is a block diagram illustrating a 3D mapping of a room in which a base station and UE resides, where the UE is configured to provide enhanced beam management using XR perception data according to one or more aspects.

FIG. 5 is a block diagram illustrating a 3D mapping 500 of room 50 in which a base station 105 and UE 115 resides, where UE 115 is configured to provide enhanced beam management using XR perception data according to one or more aspects. UE 115 is located within room 50 that includes a number of static objects, such as bed 501, dining set 502, and couch 503, and a dynamic object, such as person 504. UE 115 is in communication with base station 105 using mmW frequencies and, as UE 115 and person 504 move within room 50, the various objects could block the line-of-sight (LOS) between UE 115 and base station 105, which could block the serving beam pairs.

Blockage of LOS can have a negative impact on performance of UE 115 in mmW frequencies. Thus, predicting blockage may be beneficial for preserving performance. There may be two main types of blockage: static blockage, which may be caused by a static object in room 50 (e.g., bed 501, dining set 502, and couch 503) and dynamic blockage, which may be caused by a dynamic object (e.g., person) moving between UE 115 and base station 105. The perception information available to UE 115, such as camera snapshots, SLAM data, and 6 DoF information can be exploited to predict both static and dynamic blockage.

In addition to using the perception information to determine a transpositional representation for enhancing beam selection or beam management, the perception information may be used to construct an electronic representation of the visual environment in which UE 115 is located. As UE 115 moves around room 50, it uses the perception information from the XR sensors, such as the XR sensors (cameras 602a-n, IMU sensors 603a-n, and UE 105c) shown in FIG. 6, to create 3D mapping 500 of the visual environment of room 50. 3D mapping 500 may comprise a 3D mesh and SLAM map based on the visual and positional information of the camera snapshots, SLAM data, and 6 DoF information. UE 115 may also obtain the location of base station 105.

Once 3D mapping 500 of room 50 is created, when UE 115 moves around room 50, it may analyze its position within 3D mapping 500 to determine whether any identified static object (e.g., bed 501, dining set 502, and couch 503) may block the UE serving beam with base station 105. In one example implementation, UE 115 may use the extracted 6 DoF information to track motion of UE 115 in 3D mapping every X Hz providing its location and orientation, where X may include various frequencies, such as 20, 30, or 50 Hz, or the like. For example, UE 115 detects its motion in direction 51 and analyzes the visual environment in 3D mapping 500 to predict that bed 501 will block the existing serving beam pair 505 with continued movement in direction 51. With the predicted blockage, UE 115 may further use the perception information to determine the transpositional representation and identify the candidate UE beams to measure for beam selection.

In an additional aspect, UE 115 may not only identify candidate LOS UE beams but may also identify candidate non-LOS (NLOS) UE beams when a blockage indicates limited practical LOS beams are available. For example, when UE 115 predicts blockage of existing serving beam pair 505 during movement in direction 51, there may not be many direct, LOS beams available in the direction of base station 105. Using its location, the location of base station 105, 3D mapping, which contains the location of the static objects (e.g., bed 501, dining set 502, and couch 503), UE 115 can predict that a NLOS situation is about to happen and change its beam search list accordingly. In one example implementation, UE 115 may reset its beam database and start searching for the best beam. In another example implementation, UE 115 may restrict the beam search to the widest beams in the codebook.

In addition to the process of creating 3D mapping 500, as described above, the additional aspect may further include image recognition technology (e.g., machine learning perception algorithms, etc.), which may detect a surface of an object within 3D mapping 500 and determine the radio frequency (RF) reflectance properties of the object surface. In one example of such operation, UE 115 identifies dining set 502 as a static object within 3D mapping 500 of room 50. UE 115 applies image recognition technology to dining set 502 to identify table surface 502s and determine the RF reflectance properties of table surface 502s. With the knowledge of the determined RF reflectance properties of table surface 502s, UE 115 may use the transpositional representation to determine candidate NLOS beams to measure for beam selection in anticipation of a beam blockage as UE 115 moves along direction 51. Such determination of candidate NLOS beams may be determined using technologies such as ray-tracing. UE 115 may then rank and select the directions based on the signal strength, creating a pool of NLOS beam paths to be used for beam search. As illustrated, UE 115 may select UE NLOS beam 506 as the next UE serving beam.

In determining candidate beam directions, whether LOS or NLOS beam directions, UE 115 may use the location of base station 105. UE 115 may obtain the location of base station 105 either directly from base station 105 or by detecting the location. In one example implementation, base station 105 may communicate its model number to UE 115. Using object detection and available information of the visual image of the base station model number, UE 115 may examine the camera image perception information to identify base station 105 and its location within the visual environment.

In a dynamic blocking scenario, when UE 115 moves around room 50, it may analyze its position within 3D mapping 500 to determine whether any identified dynamic object (e.g., person 504) may block the UE serving beam with base station 105. For example, UE 115 detects the motion of person 504 in direction 52 and analyzes the visual environment in 3D mapping 500 to predict that person 504 will block the existing serving beam pair 505 with continued movement in direction 52. With the predicted blockage, UE 115 may further use the perception information to determine the transpositional representation and identify the candidate UE beams to measure for beam selection. As noted above, UE 115 may then use the transpositional representation for intelligent beam selection by determining candidate LOS or NLOS beams and determining a measurement operation of the candidate beams that takes into account the environmental conditions.

In one or more aspects, techniques for supporting enhanced beam management using XR perception data may include additional aspects, such as any single aspect or any combination of aspects described below or in connection with one or more other processes or devices described elsewhere herein. In one or more aspects, supporting enhanced beam management using XR perception data according to aspects of the present disclosure may include a UE configured to establish a communication connection between the UE and a serving base station using a current serving beam selected by the UE from a plurality of available beams paired with a serving base station beam. The UE is further configured to obtain perception information from one or more extended reality sensors associated with the UE. The UE is further configured to determine, in response to detection of a movement of the UE, a transpositional representation of the movement using the perception information. The UE is further configured to select a new serving beam from the plurality of available beams, wherein the selecting is in accordance with the transpositional representation.

Additionally, the UE may perform or operate according to one or more aspects as described below. In some implementations, the apparatus may include at least one processor, and a memory coupled to the processor. The processor may be configured to perform operations described herein with respect to the apparatus. In some other implementations, the UE may include a non-transitory computer-readable medium having program code recorded thereon and the program code may be executable by a computer for causing the computer to perform operations described herein with reference to the apparatus. In some implementations, the UE may include one or more means configured to perform operations described herein. In some implementations, a method of wireless communication may include one or more operations described herein with reference to the UE.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect includes a method of wireless communication performed by a UE including establishing a communication connection between the UE and a serving base station using a current serving beam selected by the UE from a plurality of available beams paired with a serving base station beam; obtaining, by the UE, perception information from one or more extended reality sensors associated with the UE; determining, by the UE, in response to detection of a movement of the UE, a transpositional representation of the movement using the perception information; and selecting, by the UE, a new serving beam from the plurality of available beams, wherein the selecting is in accordance with the transpositional representation.

In a second aspect, alone or in combination with the first aspect, wherein the determining the transpositional representation includes: detecting the movement as a rotation of the UE; and identifying the new serving beam from the plurality of available beams using an angle of the rotation in relation to the current serving beam, wherein the angle of the rotation is determined using the perception information.

In a third aspect, alone or in combination with one or more of the first aspect or the second aspect, wherein the determining the transpositional representation includes: detecting the movement as a linear translation of the UE in relation to a position of the serving base station; and identifying the new serving beam from the plurality of available beams using a linear transposition in relation to the current serving beam, wherein the linear transposition is determined using the position of the serving base station and the perception information identifying a prior location of the UE and the new location of the UE.

In a fourth aspect, alone or in combination with one or more of the first aspect through the third aspect, wherein the obtaining the perception information includes: receiving visual information and positional information regarding a visual environment in which the UE is located, wherein the visual information and the positional information is received from the one or more extended reality sensors; generating a 3D representational map of the visual environment including one or both of one or more static objects and one or more dynamic objects; and identifying a position of the serving base station within the 3D representational map.

In a fifth aspect, alone or in combination with one or more of the first aspect through the fourth aspect, further including: detecting a blockage of the current serving beam by one or more of the one or more static objects and the one or more dynamic objects, wherein the selecting the new serving beam is executed in response to the blockage.

In a sixth aspect, alone or in combination with one or more of the first aspect through the fifth aspect, wherein the selecting the new serving beam includes one of: initiating a new search for the plurality of available beams and identifying a best available beam of the plurality of available beams for the new serving beam, wherein the best available beam is in relation to the position of the serving base station;

or searching one or more widest beams of the plurality of available beams and identifying the best widest available beam of the plurality of available beams for the new serving beam, wherein the best widest available beam is in relation to the position of the serving base station.

In a seventh aspect, alone or in combination with one or more of the first aspect through the sixth aspect, wherein the detecting the blockage includes: detecting the movement of the UE; identifying the transpositional representation of the UE within the 3D representational map; determining a blockage of the current serving beam by one or more static objects in relation to the transpositional representation of the UE within the 3D representational map.

In an eighth aspect, alone or in combination with one or more of the first aspect through the seventh aspect, wherein the detecting the blockage includes: interpolating a predicted position of at least one dynamic object of the one or more dynamic objects in accordance with a motion of the at least one dynamic object; and determining a dynamic blockage of the current serving beam according to the predicted position of the at least one dynamic object.

In a ninth aspect, alone or in combination with one or more of the first aspect through the eighth aspect, wherein the obtaining the perception information further includes: determining a radio frequency reflectance property for each of the one or more static objects and the one or more dynamic objects, and wherein the selecting the new serving beam further includes: calculating a plurality of reflective paths between a location of the UE and the position of the serving base station in accordance with the radio frequency reflectance property; generating a pool of non-line of sight beam paths in accordance with the plurality of reflective paths; initiating a new search for the plurality of available beams along the pool of non-line of sight beam paths; and selecting the new serving beam from the plurality of available beams long the pool of non-line of sight beam paths.

In a tenth aspect, alone or in combination with one or more of the first aspect through the ninth aspect, wherein the identifying a position of the serving base station includes: receiving from the serving base station a model identification indicator; conducting object detection processing on the visual information regarding the visual environment; matching an object within the visual information to image data associated with the model identification indicator according to the objection detection processing; and identifying the position of the serving base station according to a location of the object within the visual information.

In an eleventh aspect, alone or in combination with one or more of the first aspect through the tenth aspect, wherein the perception information includes one or more of: six degrees of freedom parameters; one or more visual images of a visual environment in which the UE is located; visual information and positional information of the visual environment; and a set of points captured by the UE, wherein the set of points represent a mapping of the visual environment.

In a twelfth aspect, alone or in combination with one or more of the first aspect through the eleventh aspect, wherein the one or more extended reality sensors includes one or more of: a camera; and an IMU.

A thirteenth aspect may include a UE configured for wireless communication including at least one processor; and a memory coupled to the at least one processor, wherein the at least one processor is configured: to establish a communication connection between the UE and a serving base station using a current serving beam selected by the UE from a plurality of available beams paired with a serving base station beam; to obtain, by the UE, perception information from one or more extended reality sensors associated with the UE; to determine, by the UE, in response to detection of a movement of the UE, a transpositional representation of the movement using the perception information; and to select, by the UE, a new serving beam from the plurality of available beams, wherein the configuration of the at least one processor to select is in accordance with the transpositional representation.

In a fourteenth aspect, alone or in combination with the thirteenth aspect, wherein the configuration of the at least one processor to determine the transpositional representation includes configuration of the at least one processor: to detect the movement as a rotation of the UE; and to identify the new serving beam from the plurality of available beams using an angle of the rotation in relation to the current serving beam, wherein the angle of the rotation is determined using the perception information.

In a fifteenth aspect, alone or in combination with one or more of the thirteenth aspect or the fourteenth aspect, wherein the configuration of the at least one processor to determine the transpositional representation includes configuration of the at least one processor: to detect the movement as a linear translation of the UE in relation to a position of the serving base station; and to identify the new serving beam from the plurality of available beams using a linear transposition in relation to the current serving beam, wherein the linear transposition is determined using the position of the serving base station and the perception information identifying a prior location of the UE and the new location of the UE.

In a sixteenth aspect, alone or in combination with one or more of the thirteenth aspect through the fifteenth aspect, wherein the configuration of the at least one processor to obtain the perception information includes configuration of the at least one processor: to receive visual information and positional information regarding a visual environment in which the UE is located, wherein the visual information and the positional information is received from the one or more extended reality sensors; to generate a 3D representational map of the visual environment including one or both of one or more static objects and one or more dynamic objects; and to identify a position of the serving base station within the 3D representational map.

In a seventeenth aspect, alone or in combination with one or more of the thirteenth aspect through the sixteenth aspect, further including configuration of the at least one processor: to detect a blockage of the current serving beam by one or more of the one or more static objects and the one or more dynamic objects, wherein the configuration of the at least one processor to select the new serving beam is executed in response to the blockage.

In an eighteenth aspect, alone or in combination with one or more of the thirteenth aspect through the seventeenth aspect, wherein the configuration of the at least one processor to select the new serving beam includes configuration of the at least one processor to one of: initiate a new search for the plurality of available beams and identifying a best available beam of the plurality of available beams for the new serving beam, wherein the best available beam is in relation to the position of the serving base station; or search one or more widest beams of the plurality of available beams and identify the best widest available beam of the plurality of available beams for the new serving beam, wherein the best widest available beam is in relation to the position of the serving base station.

In a nineteenth aspect, alone or in combination with one or more of the thirteenth aspect through the eighteenth aspect, wherein the configuration of the at least one processor to detect the blockage includes configuration of the at least one processor: to detect the movement of the UE; to identify the transpositional representation of the UE within the 3D representational map; and to determine a blockage of the current serving beam by one or more static objects in relation to the transpositional representation of the UE within the 3D representational map.

In a twentieth aspect, alone or in combination with one or more of the thirteenth aspect through the nineteenth aspect, wherein the configuration of the at least one processor to detect the blockage includes configuration of the at least one processor: to interpolate a predicted position of at least one dynamic object of the one or more dynamic objects in accordance with a motion of the at least one dynamic object; and to determine a dynamic blockage of the current serving beam according to the predicted position of the at least one dynamic object.

In a twenty-first aspect, alone or in combination with one or more of the thirteenth aspect through the twentieth aspect, wherein the configuration of the at least one processor to obtain the perception information further includes configuration of the at least one processor: to determine a radio frequency reflectance property for each of the one or more static objects and the one or more dynamic objects, and wherein the configuration of the at least one processor to select the new serving beam further includes configuration of the at least one processor: to calculate a plurality of reflective paths between a location of the UE and the position of the serving base station in accordance with the radio frequency reflectance property; to generate a pool of non-line of sight beam paths in accordance with the plurality of reflective paths; to initiate a new search for the plurality of available beams along the pool of non-line of sight beam paths; and to select the new serving beam from the plurality of available beams long the pool of non-line of sight beam paths.

In a twenty-second aspect, alone or in combination with one or more of the thirteenth aspect through the twenty-first aspect, wherein the configuration of the at least one processor to identify a position of the serving base station includes configuration of the at least one processor: to receive from the serving base station a model identification indicator; to conduct object detection processing on the visual information regarding the visual environment; to match an object within the visual information to image data associated with the model identification indicator according to the objection detection processing; and to identify the position of the serving base station according to a location of the object within the visual information.

In a twenty-third aspect, alone or in combination with one or more of the thirteenth aspect through the twenty-second aspect, wherein the perception information includes one or more of: six degrees of freedom parameters; one or more visual images of a visual environment in which the UE is located; visual information and positional information of the visual environment; and a set of points captured by the UE, wherein the set of points represent a mapping of the visual environment.

In a twenty-fourth aspect, alone or in combination with one or more of the thirteenth aspect through the twenty-third aspect, wherein the one or more extended reality sensors includes one or more of: a camera; and an IMU.

A twenty-fifth aspect may include a UE configured for wireless communication including means for establishing a communication connection between the UE and a serving base station using a current serving beam selected by the UE from a plurality of available beams paired with a serving base station beam; means for obtaining, by the UE, perception information from one or more extended reality sensors associated with the UE; means for determining, by the UE, in response to detection of a movement of the UE, a transpositional representation of the movement using the perception information; and means for selecting, by the UE, a new serving beam from the plurality of available beams, wherein the means for selecting is executed in accordance with the transpositional representation.

In a twenty-sixth aspect, alone or in combination with the twenty-fifth aspect, wherein the means for determining the transpositional representation includes: means for detecting the movement as a rotation of the UE; and means for identifying the new serving beam from the plurality of available beams using an angle of the rotation in relation to the current serving beam, wherein the angle of the rotation is determined using the perception information.

In a twenty-seventh aspect, alone or in combination with one or more of the twenty-fifth aspect or the twenty-sixth aspect, wherein the means for determining the transpositional representation includes: means for detecting the movement as a linear translation of the UE in relation to a position of the serving base station; and means for identifying the new serving beam from the plurality of available beams using a linear transposition in relation to the current serving beam, wherein the linear transposition is determined using the position of the serving base station and the perception information identifying a prior location of the UE and the new location of the UE.

In a twenty-eighth aspect, alone or in combination with one or more of the twenty-fifth aspect through the twenty-seventh aspect, wherein the means for obtaining the perception information includes: means for receiving visual information and positional information regarding a visual environment in which the UE is located, wherein the visual information and the positional information is received from the one or more extended reality sensors; means for generating a 3D representational map of the visual environment including one or both of one or more static objects and one or more dynamic objects; and means for identifying a position of the serving base station within the 3D representational map.

In a twenty-ninth aspect, alone or in combination with one or more of the twenty-fifth aspect through the twenty-eighth aspect, further including: means for detecting a blockage of the current serving beam by one or more of the one or more static objects and the one or more dynamic objects, wherein the means for selecting the new serving beam is executed in response to the blockage.

In a thirtieth aspect, alone or in combination with one or more of the twenty-fifth aspect through the twenty-ninth aspect, wherein the means for selecting the new serving beam includes one of: means for initiating a new search for the plurality of available beams and means for identifying a best available beam of the plurality of available beams for the new serving beam, wherein the best available beam is in relation to the position of the serving base station; or means for searching one or more widest beams of the plurality of available beams and means for identifying the best widest available beam of the plurality of available beams for the new serving beam, wherein the best widest available beam is in relation to the position of the serving base station.

In a thirty-first aspect, alone or in combination with one or more of the twenty-fifth aspect through the thirtieth aspect, wherein the means for detecting the blockage includes: means for detecting the movement of the UE;

means for identifying the transpositional representation of the UE within the 3D representational map; means for determining a blockage of the current serving beam by one or more static objects in relation to the transpositional representation of the UE within the 3D representational map.

In a thirty-second aspect, alone or in combination with one or more of the twenty-fifth aspect through the thirty-first aspect, wherein the means for detecting the blockage includes: means for interpolating a predicted position of at least one dynamic object of the one or more dynamic objects in accordance with a motion of the at least one dynamic object; and means for determining a dynamic blockage of the current serving beam according to the predicted position of the at least one dynamic object.

In a thirty-third aspect, alone or in combination with one or more of the twenty-fifth aspect through the thirty-second aspect, wherein the means for obtaining the perception information further includes: means for determining a radio frequency reflectance property for each of the one or more static objects and the one or more dynamic objects, and wherein the means for selecting the new serving beam further includes: means for calculating a plurality of reflective paths between a location of the UE and the position of the serving base station in accordance with the radio frequency reflectance property; means for generating a pool of non-line of sight beam paths in accordance with the plurality of reflective paths; means for initiating a new search for the plurality of available beams along the pool of non-line of sight beam paths; and means for selecting the new serving beam from the plurality of available beams long the pool of non-line of sight beam paths.

In a thirty-fourth aspect, alone or in combination with one or more of the twenty-fifth aspect through the thirty-third aspect, wherein the means for identifying a position of the serving base station includes: means for receiving from the serving base station a model identification indicator; means for conducting object detection processing on the visual information regarding the visual environment; means for matching an object within the visual information to image data associated with the model identification indicator according to the objection detection processing; and means for identifying the position of the serving base station according to a location of the object within the visual information.

In a thirty-fifth aspect, alone or in combination with one or more of the twenty-fifth aspect through the thirty-fourth aspect, wherein the perception information includes one or more of: six degrees of freedom parameters; one or more visual images of a visual environment in which the UE is located; visual information and positional information of the visual environment; and a set of points captured by the UE, wherein the set of points represent a mapping of the visual environment.

In a thirty-sixth aspect, alone or in combination with one or more of the twenty-fifth aspect through the thirty-fifth aspect, wherein the one or more extended reality sensors includes one or more of: a camera; and an IMU.

A thirty-seventh aspect may include a non-transitory computer-readable medium having program code recorded thereon, the program code including program code executable by a computer for causing the computer to establish a communication connection between the UE and a serving base station using a current serving beam selected by the UE from a plurality of available beams paired with a serving base station beam; program code executable by the computer for causing the computer to obtain, by the UE, perception information from one or more extended reality sensors associated with the UE; program code executable by the computer for causing the computer to determine, by the UE, in response to detection of a movement of the UE, a transpositional representation of the movement using the perception information; and program code executable by the computer for causing the computer to select, by the UE, a new serving beam from the plurality of available beams, wherein the program code executable by the computer for causing the computer to select is in accordance with the transpositional representation.

In a thirty-eighth aspect, alone or in combination with the thirty-seventh aspect, wherein the program code executable by the computer for causing the computer to determine the transpositional representation includes program code executable by the computer for causing the computer: to detect the movement as a rotation of the UE; and to identify the new serving beam from the plurality of available beams using an angle of the rotation in relation to the current serving beam, wherein the angle of the rotation is determined using the perception information.

In a thirty-ninth aspect, alone or in combination with one or more of the thirty-seventh aspect and the thirty-eighth aspect, wherein the program code executable by the computer for causing the computer to determine the transpositional representation includes program code executable by the computer for causing the computer: to detect the movement as a linear translation of the UE in relation to a position of the serving base station; and to identify the new serving beam from the plurality of available beams using a linear transposition in relation to the current serving beam, wherein the linear transposition is determined using the position of the serving base station and the perception information identifying a prior location of the UE and the new location of the UE.

In a fortieth aspect, alone or in combination with one or more of the thirty-seventh aspect and the thirty-ninth aspect, wherein the program code executable by the computer for causing the computer to obtain the perception information includes program code executable by the computer for causing the computer: to receive visual information and positional information regarding a visual environment in which the UE is located, wherein the visual information and the positional information is received from the one or more extended reality sensors; to generate a 3D representational map of the visual environment including one or both of one or more static objects and one or more dynamic objects; and to identify a position of the serving base station within the 3D representational map.

In a forty-first aspect, alone or in combination with one or more of the thirty-seventh aspect and the fortieth aspect, further including program code executable by the computer for causing the computer: to detect a blockage of the current serving beam by one or more of the one or more static objects and the one or more dynamic objects, wherein the program code executable by the computer for causing the computer to select the new serving beam is executed in response to the blockage.

In a forty-second aspect, alone or in combination with one or more of the thirty-seventh aspect and the forty-first aspect, wherein the program code executable by the computer for causing the computer to select the new serving beam includes program code executable by the computer for causing the computer to one of: initiate a new search for the plurality of available beams and identifying a best available beam of the plurality of available beams for the new serving beam, wherein the best available beam is in relation to the position of the serving base station; or search one or more widest beams of the plurality of available beams and identify the best widest available beam of the plurality of available beams for the new serving beam, wherein the best widest available beam is in relation to the position of the serving base station.

In a forty-third aspect, alone or in combination with one or more of the thirty-seventh aspect and the forty-second aspect, wherein the program code executable by the computer for causing the computer to detect the blockage includes program code executable by the computer for causing the computer: to detect the movement of the UE; to identify the transpositional representation of the UE within the 3D representational map; to determine a blockage of the current serving beam by one or more static objects in relation to the transpositional representation of the UE within the 3D representational map.

In a forty-fourth aspect, alone or in combination with one or more of the thirty-seventh aspect and the forty-third aspect, wherein the program code executable by the computer for causing the computer to detect the blockage includes program code executable by the computer for causing the computer: to interpolate a predicted position of at least one dynamic object of the one or more dynamic objects in accordance with a motion of the at least one dynamic object; to determine a dynamic blockage of the current serving beam according to the predicted position of the at least one dynamic object;

In a forty-fifth aspect, alone or in combination with one or more of the thirty-seventh aspect and the forty-fourth aspect, wherein the program code executable by the computer for causing the computer to obtain the perception information further includes program code executable by the computer for causing the computer: to determine a radio frequency reflectance property for each of the one or more static objects and the one or more dynamic objects, and wherein the program code executable by the computer for causing the computer to select the new serving beam further includes program code executable by the computer for causing the computer: to calculate a plurality of reflective paths between a location of the UE and the position of the serving base station in accordance with the radio frequency reflectance property; to generate a pool of non-line of sight beam paths in accordance with the plurality of reflective paths; to initiate a new search for the plurality of available beams along the pool of non-line of sight beam paths; and to select the new serving beam from the plurality of available beams long the pool of non-line of sight beam paths.

In a forty-sixth aspect, alone or in combination with one or more of the thirty-seventh aspect and the forty-fifth aspect, wherein the program code executable by the computer for causing the computer to identify a position of the serving base station includes program code executable by the computer for causing the computer: to receive from the serving base station a model identification indicator; to conduct object detection processing on the visual information regarding the visual environment; to match an object within the visual information to image data associated with the model identification indicator according to the objection detection processing; and to identify the position of the serving base station according to a location of the object within the visual information.

In a forty-seventh aspect, alone or in combination with one or more of the thirty-seventh aspect and the forty-sixth aspect, wherein the perception information includes one or more of: six degrees of freedom parameters; one or more visual images of a visual environment in which the UE is located; visual information and positional information of the visual environment; and a set of points captured by the UE, wherein the set of points represent a mapping of the visual environment.

In a forty-eighth aspect, alone or in combination with one or more of the thirty-seventh aspect and the forty-seventh aspect, wherein the one or more extended reality sensors includes one or more of: a camera; and an IMU.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   establishing a communication connection between the UE and a serving base station using a current serving beam selected by the UE from a plurality of available beams paired with a serving base station beam;
   obtaining, by the UE, perception information from one or more extended reality sensors associated with the UE;
   determining, by the UE, in response to detection of a movement of the UE, a transpositional representation of the movement using the perception information; and
   selecting, by the UE, a new serving beam from the plurality of available beams, wherein the selecting is in accordance with the transpositional representation, and wherein the transpositional representation encodes information corresponding to an angle of rotation of the UE.

2. The method of claim 1, wherein the determining the transpositional representation includes:
   detecting the movement as a rotation of the UE; and
   identifying the new serving beam from the plurality of available beams using an angle of the rotation in relation to the current serving beam, wherein the angle of the rotation is determined using the perception information.

3. The method of claim 1, wherein the determining the transpositional representation includes:
   detecting the movement as a linear translation of the UE in relation to a position of the serving base station; and
   identifying the new serving beam from the plurality of available beams using a linear transposition in relation to the current serving beam, wherein the linear transposition is determined using the position of the serving base station and the perception information identifying a prior location of the UE and a new location of the UE.

4. The method of claim 1, wherein the obtaining the perception information includes:
   receiving visual information and positional information regarding a visual environment in which the UE is located, wherein the visual information and the positional information is received from the one or more extended reality sensors;
   generating a three-dimensional (3D) representational map of the visual environment including one or both of one or more static objects and one or more dynamic objects; and
   identifying a position of the serving base station within the 3D representational map.

5. The method of claim 4, further including:
   detecting a blockage of the current serving beam by one or more of the one or more static objects and the one or more dynamic objects, wherein the selecting the new serving beam is executed in response to the blockage.

6. The method of claim 5, wherein the selecting the new serving beam includes one of:
   initiating a new search for the plurality of available beams and identifying a best available beam of the plurality of available beams for the new serving beam, wherein the best available beam is in relation to the position of the serving base station; or
   searching one or more widest beams of the plurality of available beams and identifying a best widest available beam of the plurality of available beams for the new serving beam, wherein the best widest available beam is in relation to the position of the serving base station.

7. The method of claim 6, wherein the detecting the blockage includes:
   detecting the movement of the UE;
   identifying the transpositional representation of the movement within the 3D representational map; and
   determining a blockage of the current serving beam by one or more static objects in relation to the transpositional representation of the movement within the 3D representational map.

8. The method of claim 6, wherein the detecting the blockage includes:
   interpolating a predicted position of at least one dynamic object of the one or more dynamic objects in accordance with a motion of the at least one dynamic object; and
   determining a dynamic blockage of the current serving beam according to the predicted position of the at least one dynamic object.

9. The method of claim 6,
   wherein the obtaining the perception information further includes:
      determining a radio frequency reflectance property for each of the one or more static objects and the one or more dynamic objects, and
   wherein the selecting the new serving beam further includes:
      calculating a plurality of reflective paths between a location of the UE and the position of the serving base station in accordance with the radio frequency reflectance property;
      generating a pool of non-line of sight beam paths in accordance with the plurality of reflective paths;
      initiating a new search for the plurality of available beams along the pool of non-line of sight beam paths; and
      selecting the new serving beam from the plurality of available beams long the pool of non-line of sight beam paths.

10. The method of claim 4, wherein the identifying the position of the serving base station includes:
    receiving from the serving base station a model identification indicator;
    conducting object detection processing on the visual information regarding the visual environment;
    matching an object within the visual information to image data associated with the model identification indicator according to the object detection processing; and
    identifying the position of the serving base station according to a location of the object within the visual information.

11. The method of claim 1, wherein the perception information includes one or more of:
    six degrees of freedom parameters;
    one or more visual images of a visual environment in which the UE is located;
    visual information and positional information of the visual environment; and
    a set of points captured by the UE, wherein the set of points represent a mapping of the visual environment.

12. The method of claim 1, wherein the one or more extended reality sensors includes one or more of:
    a camera; and
    an inertial measurement unit (IMU).

13. A user equipment (UE) configured for wireless communication, the UE comprising:
   at least one processor; and
   a memory coupled to the at least one processor,
   wherein the at least one processor is configured:
      to establish a communication connection between the UE and a serving base station using a current serving beam selected by the UE from a plurality of available beams paired with a serving base station beam;
      to obtain, by the UE, perception information from one or more extended reality sensors associated with the UE;
      to determine, by the UE, in response to detection of a movement of the UE, a transpositional representation of the movement using the perception information; and
      to select, by the UE, a new serving beam from the plurality of available beams, wherein the configuration of the at least one processor to select is in accordance with the transpositional representation, and wherein the transpositional representation encodes information corresponding to an angle of rotation of the UE.

14. The UE of claim 13, wherein the configuration of the at least one processor to determine the transpositional representation includes configuration of the at least one processor:
   to detect the movement as a rotation of the UE; and
   to identify the new serving beam from the plurality of available beams using an angle of the rotation in relation to the current serving beam, wherein the angle of the rotation is determined using the perception information.

15. The UE of claim 13, wherein the configuration of the at least one processor to determine the transpositional representation includes configuration of the at least one processor:
   to detect the movement as a linear translation of the UE in relation to a position of the serving base station; and
   to identify the new serving beam from the plurality of available beams using a linear transposition in relation to the current serving beam, wherein the linear transposition is determined using the position of the serving base station and the perception information identifying a prior location of the UE and a new location of the UE.

16. The UE of claim 13, wherein the configuration of the at least one processor to obtain the perception information includes configuration of the at least one processor:
   to receive visual information and positional information regarding a visual environment in which the UE is located, wherein the visual information and the positional information is received from the one or more extended reality sensors;
   to generate a three-dimensional (3D) representational map of the visual environment including one or both of one or more static objects and one or more dynamic objects; and
   to identify a position of the serving base station within the 3D representational map.

17. The UE of claim 16, further including configuration of the at least one processor:
   to detect a blockage of the current serving beam by one or more of the one or more static objects and the one or more dynamic objects, wherein the configuration of the at least one processor to select the new serving beam is executed in response to the blockage.

18. The UE of claim 17, wherein the configuration of the at least one processor to select the new serving beam includes configuration of the at least one processor to one of:
   initiate a new search for the plurality of available beams and identifying a best available beam of the plurality of available beams for the new serving beam, wherein the best available beam is in relation to the position of the serving base station; or
   search one or more widest beams of the plurality of available beams and identify a best widest available beam of the plurality of available beams for the new serving beam, wherein the best widest available beam is in relation to the position of the serving base station.

19. The UE of claim 18, wherein the configuration of the at least one processor to detect the blockage includes configuration of the at least one processor:
   to detect the movement of the UE;
   to identify the transpositional representation of the movement within the 3D representational map; and
   to determine a blockage of the current serving beam by one or more static objects in relation to the transpositional representation of the movement within the 3D representational map.

20. The UE of claim 18, wherein the configuration of the at least one processor to detect the blockage includes configuration of the at least one processor:
   to interpolate a predicted position of at least one dynamic object of the one or more dynamic objects in accordance with a motion of the at least one dynamic object; and
   to determine a dynamic blockage of the current serving beam according to the predicted position of the at least one dynamic object.

21. The UE of claim 18,
   wherein the configuration of the at least one processor to obtain the perception information further includes configuration of the at least one processor:
      to determine a radio frequency reflectance property for each of the one or more static objects and the one or more dynamic objects, and
   wherein the configuration of the at least one processor to select the new serving beam further includes configuration of the at least one processor:
      to calculate a plurality of reflective paths between a location of the UE and the position of the serving base station in accordance with the radio frequency reflectance property;
      to generate a pool of non-line of sight beam paths in accordance with the plurality of reflective paths;
      to initiate a new search for the plurality of available beams along the pool of non-line of sight beam paths; and
      to select the new serving beam from the plurality of available beams long the pool of non-line of sight beam paths.

22. The UE of claim 16, wherein the configuration of the at least one processor to identify the position of the serving base station includes configuration of the at least one processor:
   to receive from the serving base station a model identification indicator;
   to conduct object detection processing on the visual information regarding the visual environment;
   to match an object within the visual information to image data associated with the model identification indicator according to the object detection processing; and to identify the position of the serving base station according to a location of the object within the visual information.

23. The UE of claim 13, wherein the perception information includes one or more of:
   six degrees of freedom parameters;
   one or more visual images of a visual environment in which the UE is located;
   visual information and positional information of the visual environment; and
   a set of points captured by the UE, wherein the set of points represent a mapping of the visual environment.

24. The UE of claim 13, wherein the one or more extended reality sensors includes one or more of:
   a camera; and
   an inertial measurement unit (IMU).

25. A user equipment (UE) configured for wireless communication, comprising:
   means for establishing a communication connection between the UE and a serving base station using a current serving beam selected by the UE from a plurality of available beams paired with a serving base station beam;
   means for obtaining, by the UE, perception information from one or more extended reality sensors associated with the UE;
   means for determining, by the UE, in response to detection of a movement of the UE, a transpositional representation of the movement using the perception information; and
   means for selecting, by the UE, a new serving beam from the plurality of available beams, wherein the means for selecting is executed in accordance with the transpositional representation, and wherein the transpositional representation encodes information corresponding to an angle of rotation of the UE.

26. The UE of claim 25, wherein the means for determining the transpositional representation includes:
   means for detecting the movement as a rotation of the UE; and
   means for identifying the new serving beam from the plurality of available beams using an angle of the rotation in relation to the current serving beam, wherein the angle of the rotation is determined using the perception information.

27. The UE of claim 25, wherein the means for determining the transpositional representation includes:
   means for detecting the movement as a linear translation of the UE in relation to a position of the serving base station; and
   means for identifying the new serving beam from the plurality of available beams using a linear transposition in relation to the current serving beam, wherein the linear transposition is determined using the position of the serving base station and the perception information identifying a prior location of the UE and a new location of the UE.

28. The UE of claim 25, wherein the means for obtaining the perception information includes:
   means for receiving visual information and positional information regarding a visual environment in which the UE is located, wherein the visual information and the positional information is received from the one or more extended reality sensors;
   means for generating a three-dimensional (3D) representational map of the visual environment including one or both of one or more static objects and one or more dynamic objects; and
   means for identifying a position of the serving base station within the 3D representational map.

29. The UE of claim 28, further including:
   means for detecting a blockage of the current serving beam by one or more of the one or more static objects and the one or more dynamic objects, wherein the means for selecting the new serving beam is executed in response to the blockage.

30. A non-transitory computer-readable medium having program code recorded thereon, the program code comprising:
   program code executable by a computer for causing the computer to establish a communication connection between a user equipment (UE) and a serving base station using a current serving beam selected by the UE from a plurality of available beams paired with a serving base station beam;
   program code executable by the computer for causing the computer to obtain, by the UE, perception information from one or more extended reality sensors associated with the UE;
   program code executable by the computer for causing the computer to determine, by the UE, in response to detection of a movement of the UE, a transpositional representation of the movement using the perception information; and
   program code executable by the computer for causing the computer to select, by the UE, a new serving beam from the plurality of available beams, wherein the program code executable by the computer for causing the computer to select is in accordance with the transpositional representation, and wherein the transpositional representation encodes information corresponding to an angle of rotation of the UE.

* * * * *